(12) United States Patent
Kondo et al.

(10) Patent No.: US 10,406,739 B2
(45) Date of Patent: Sep. 10, 2019

(54) PARISON GUIDE

(71) Applicants: YACHIYO INDUSTRY CO., LTD., Saitama (JP); THE JAPAN STEEL WORKS, LTD., Tokyo (JP)

(72) Inventors: Kunihiko Kondo, Saitama (JP); Kazuhiro Ohtaki, Saitama (JP); Yuji Minowa, Saitama (JP); Toshinari Takeyama, Kanagawa (JP); Toshio Kagitani, Kanagawa (JP)

(73) Assignees: YACHIYO INDUSTRY CO., LTD., Saitama (JP); THE JAPAN STEEL WORKS, LTD., Tokyo (JP)

( * ) Notice: Subject to any disclaimer, the term of this patent is extended or adjusted under 35 U.S.C. 154(b) by 0 days.

(21) Appl. No.: 15/770,216

(22) PCT Filed: Oct. 7, 2016

(86) PCT No.: PCT/JP2016/080023
§ 371 (c)(1),
(2) Date: Apr. 23, 2018

(87) PCT Pub. No.: WO2017/069011
PCT Pub. Date: Apr. 27, 2017

(65) Prior Publication Data
US 2018/0319069 A1 Nov. 8, 2018

(30) Foreign Application Priority Data
Oct. 23, 2015 (JP) ................. 2015-209153

(51) Int. Cl.
*B29C 48/00* (2019.01)
*B29C 49/00* (2006.01)
(Continued)

(52) U.S. Cl.
CPC ...... *B29C 49/4242* (2013.01); *B29C 48/0017* (2019.02); *B29C 48/0022* (2019.02);
(Continued)

(58) Field of Classification Search
CPC ............ B29C 49/0047; B29C 49/4242; B29C 2049/0068; B29C 48/0017; B29C 48/0019; B29C 48/0022; B29C 48/30
See application file for complete search history.

(56) References Cited

U.S. PATENT DOCUMENTS

| | | | | |
|---|---|---|---|---|
| 2,562,135 A | * | 7/1951 | Strobel | ................... B29C 48/30 425/325 |
| 3,909,176 A | * | 9/1975 | Madonini | .............. B29D 29/00 425/305.1 |
| 6,814,921 B1 | * | 11/2004 | Van Schaftingen | .... B29C 51/12 264/513 |

FOREIGN PATENT DOCUMENTS

| | | | | |
|---|---|---|---|---|
| GB | 1408039 A | * | 10/1975 | ............. B29C 48/30 |
| JP | S61-261021 A | | 11/1986 | |

(Continued)

OTHER PUBLICATIONS

International Search Report and Written Opinion of the International Search Report for PCT/JP2016/080023 dated Nov. 8, 2016.

*Primary Examiner* — Robert B Davis
(74) *Attorney, Agent, or Firm* — Kenealy Vaidya LLP

(57) ABSTRACT

There is provided a parison guide which improves a flatness of parison with a simple configuration. A parison guide (1) guides a parison (P) which has an arc shape in horizontal cross section and is discharged from an extrusion apparatus (2). The parison guide is fixed to a discharge-side end portion of the extrusion apparatus (2). The parison guide includes a contact face (17) configured to come into contact with and guide an edge portion of the parison to flatten the parison. Preferably, the contact face (17) includes a curved surface, and the contact face (17) has a curvature of a horizontal cross section which gets smaller in a discharge direction.

3 Claims, 8 Drawing Sheets

(51) Int. Cl.
  *B29C 49/42*    (2006.01)
  *B29C 48/09*    (2019.01)
  *B29C 49/04*    (2006.01)
  *B29C 51/02*    (2006.01)
  *B29C 48/07*    (2019.01)
  *B29C 48/32*    (2019.01)

(52) U.S. Cl.
  CPC .............. *B29C 48/07* (2019.02); *B29C 48/09* (2019.02); *B29C 48/32* (2019.02); *B29C 49/04* (2013.01); *B29C 51/02* (2013.01); *B29C 2049/048* (2013.01); *B29C 2049/4221* (2013.01); *B29C 2793/0063* (2013.01); *B29C 2793/0081* (2013.01)

(56) References Cited

FOREIGN PATENT DOCUMENTS

| | | |
|---|---|---|
| JP | 4295213 B2 | 7/2009 |
| JP | 2010505649 A | 2/2010 |
| JP | 2012240293 A | 12/2012 |
| JP | 2012240361 A | 12/2012 |
| JP | 2012240362 A | 12/2012 |
| JP | 2015080869 A | 4/2015 |

* cited by examiner

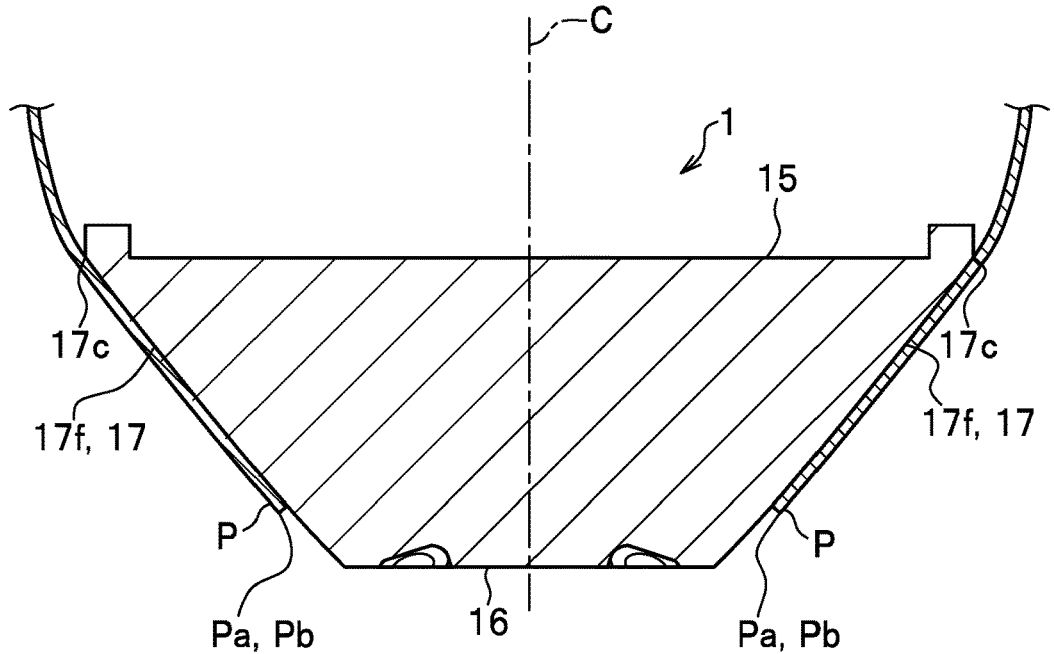
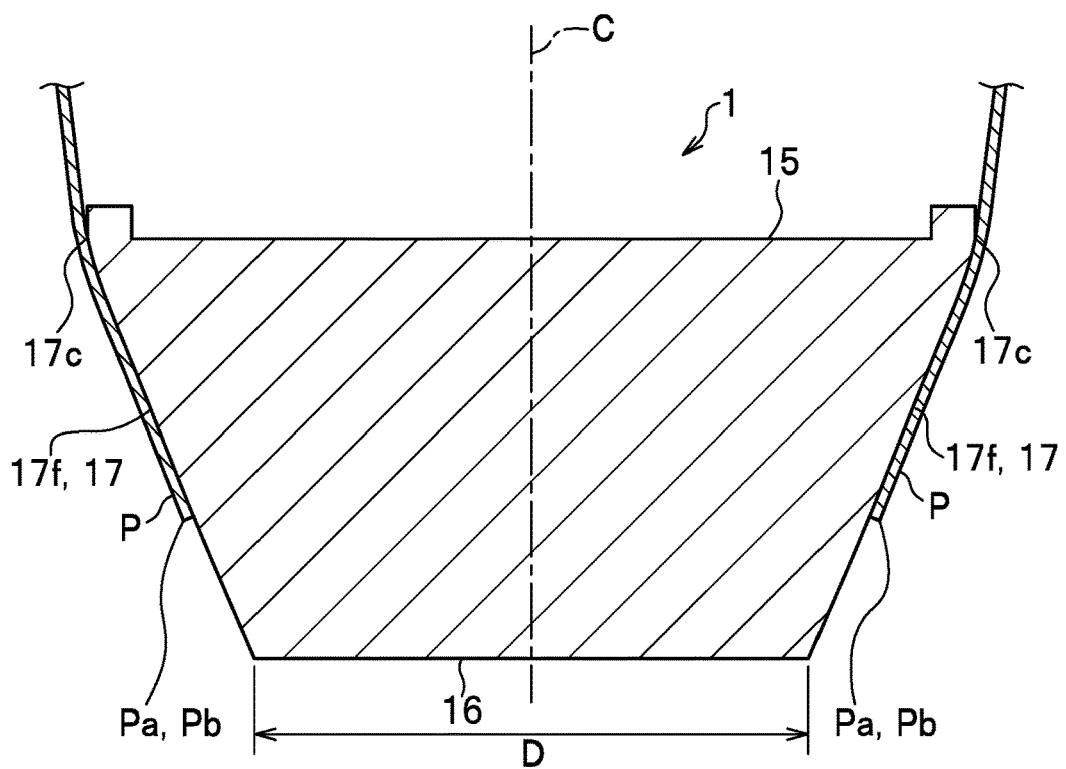

PARISON GUIDE

CROSS-REFERENCE TO RELATED APPLICATIONS

This application is a U.S. National Stage Application under 35 U.S.C § 371 of International Patent Application No. PCT/JP2016/080023 filed 7 Oct. 2016, which claims the benefit of priority to Japanese Patent Application No. 2015-209153 filed 23 Oct. 2015, the disclosures of all of which are hereby incorporated by reference in their entireties.

TECHNICAL FIELD

The present invention relates to a parison guide that guides a parison discharged from an extrusion apparatus.

BACKGROUND ART

There has been developed a parison guide that, to form a hollow resinous container, flattens parisons which are discharged from an extrusion apparatus and each of which has an arc shape in horizontal cross section. A parison guide of this type is described in and known from, for example, Patent Literature 1.

The parison guide in Patent Literature 1 includes paired rollers that each come into contact with the inner circumferential surface of a parison while rotating about a horizontal axis. The paired rollers are arranged at the respective sides of a partitioning device disposed below the extrusion apparatus.

According to this conventional technique, once a cylindrical parison is discharged from the extrusion apparatus, the parison is partitioned by the partitioning device into a pair of sheets each having an arc shape in horizontal cross section. Then, the parisons are flattened by the paired rollers. The flattened parisons are transported to a molding die by a transport apparatus such as an arm robot.

CITATION LIST

Patent Literature

Patent Literature 1: Japanese Patent No. 4295213

SUMMARY OF INVENTION

Technical Problem

This conventional technique has the following problem. When the rollers apply rotational force to the parisons having an arc shape in horizontal cross section, the parisons do not receive the rotational force evenly, and creases are likely to be generated at the widthwise end portions of each parison. As another problem, it is difficult to set structural designs of the rollers, such as their outside diameter, rotation speed, and installation positions.

The present invention has been made based on such viewpoints, and has an objective to provide a parison guide that improves flatness of a parison with a simple configuration.

Solution to Problem

To solve the above problems, the present invention provides a parison guide for guiding a parison which has an arc shape in horizontal cross section and is discharged from an extrusion apparatus, wherein the parison guide is fixed to a discharge-side end portion of the extrusion apparatus and includes a contact face configured to come into contact with and guide an edge portion of the parison to flatten the parison.

According to the present invention, no mechanical force such as rotational force is applied to the parison since the edge portion of the parison is guided by the contact face. Thus, creases are unlikely to be generated at the widthwise end portions of the parison, and the flatness of the parison is improved. Moreover, since control for the rotation of rollers is unnecessary unlike the conventional technique, the structure is simplified.

It is preferable that the contact face includes a curved surface and the contact face has a curvature of a horizontal cross section which gets smaller in a discharge direction.

With such a configuration, the parison is gradually flattened out along such a contact face in which the curvature of a horizontal cross section gets smaller in the extrusion direction, and therefore creases are more unlikely to be generated at the widthwise end portions of the parison.

It is also preferable that the contact face has a curvature of the horizontal cross section at an end portion of the contact face closer to the extrusion apparatus and the curvature corresponds to a shape that the parison has immediately after being discharged.

This enables the parison to be flattened out more gradually, and therefore creases are even more unlikely to be generated at the widthwise end portions of the parison.

Advantageous Effects of Invention

The parison guide of the present invention improves the flatness of parison with a simple configuration.

BRIEF DESCRIPTION OF DRAWINGS

FIG. 8A is an end view corresponding to FIG. 5A, and FIG. 8B is an end view corresponding to FIG. 5B.

DESCRIPTION OF EMBODIMENTS

Figure 1:
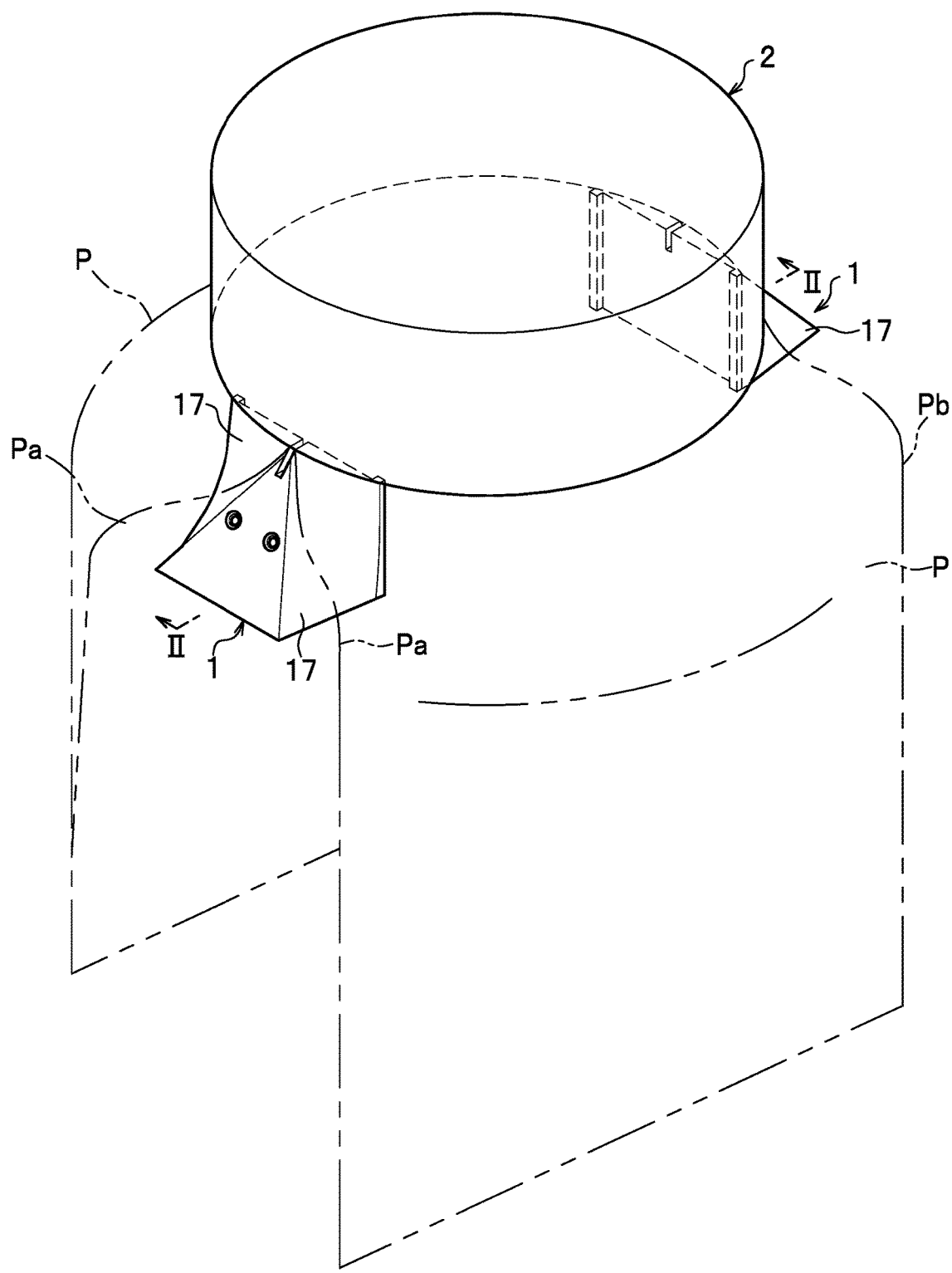
FIG. 1 is a perspective view of parison guides according to the present embodiment attached to an extrusion apparatus.

An embodiment of the present invention is described in detail with reference to the drawings. In the following description, the same elements are denoted by the same reference numerals to omit repeated description. Before giving a description of a parison guide, a description of an extrusion apparatus is given.

As illustrated in FIG. 1, an extrusion apparatus 2 is an apparatus that discharges a parison P downward. The parison P is a molten resin and is a material of a resinous molding.

The parison P in the present embodiment has a multilayer structure including a barrier layer. The extrusion apparatus 2 illustrated in FIG. 2 includes a core 21 and a die 22 disposed around the outer circumference of the core 21 with a space therefrom. The core 21 is shaped as a solid cylinder extending vertically. The core 21 is formed at the lower part of the outer circumferential surface with an outer circumferential diameter expanding surface 21a having a diameter expanding toward its lower edge. The core 21 is movable in the direction of the arrow Y, i.e., a vertical direction, by means of an actuator (not shown).

The die 22 is shaped as a hollow cylinder extending vertically. The die 22 is formed at the lower part of the inner circumferential surface with an inner circumferential diameter expanding surface 22a having a diameter expanding toward its lower edge. A hollow-cylindrical resin passage 23 is formed between the core 21 and the die 22. When a molten resin is injected from an upper opening of the resin passage 23, the molten resin is formed into the parison P of a cylindrical shape within the resin passage 23.

Paired partitioning devices (not shown) are provided inside the extrusion apparatus 2 at opposing positions 180° away from each other. The cylindrical parison P is, once discharged downward from the resin passage 23, partitioned by the partitioning devices into a pair of sheets (cut pieces) each having an arc shape in horizontal cross section.

As illustrated in FIG. 1, a parison guide 1 flattens the parisons P, P which are discharged from the extrusion apparatus 2 and each of which has an arc shape in horizontal cross section. A pair of parison guides 1 is disposed at the lower end portion of the extrusion apparatus 2. The parison guides 1, 1 are disposed to oppose each other back-to-back on an axis orthogonal to the discharge direction of the parisons P. Further, the parison guides 1, 1 are provided at positions on the inner surface sides of the parisons P, P (on the inner circumferential surface sides of the cylindrically-shaped parisons P, P), the positions corresponding to the portions along which the parisons P are to be partitioned from each other. One of the parison guides 1 guides one widthwise edge portions Pa, Pa of the parisons P, P. The other parison guide 1 guides the other widthwise edge portions Pb, Pb of the parisons P.

Figure 2:
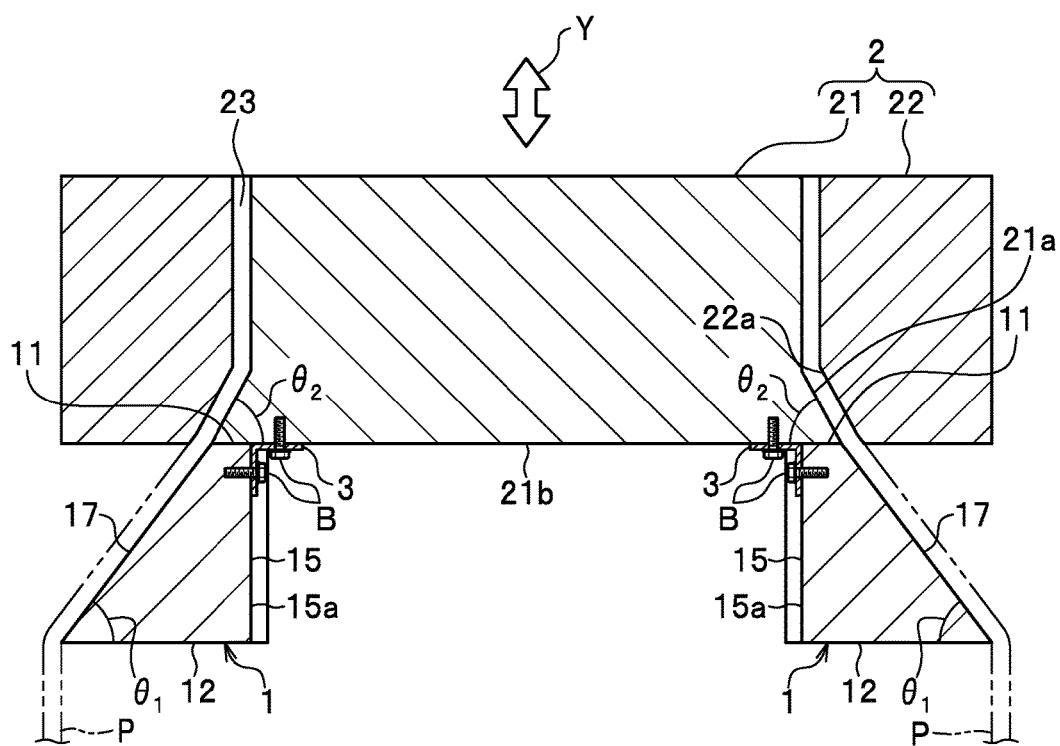
FIG. 2 is a sectional view taken along the II-II line in FIG. 1.
Figure 3:
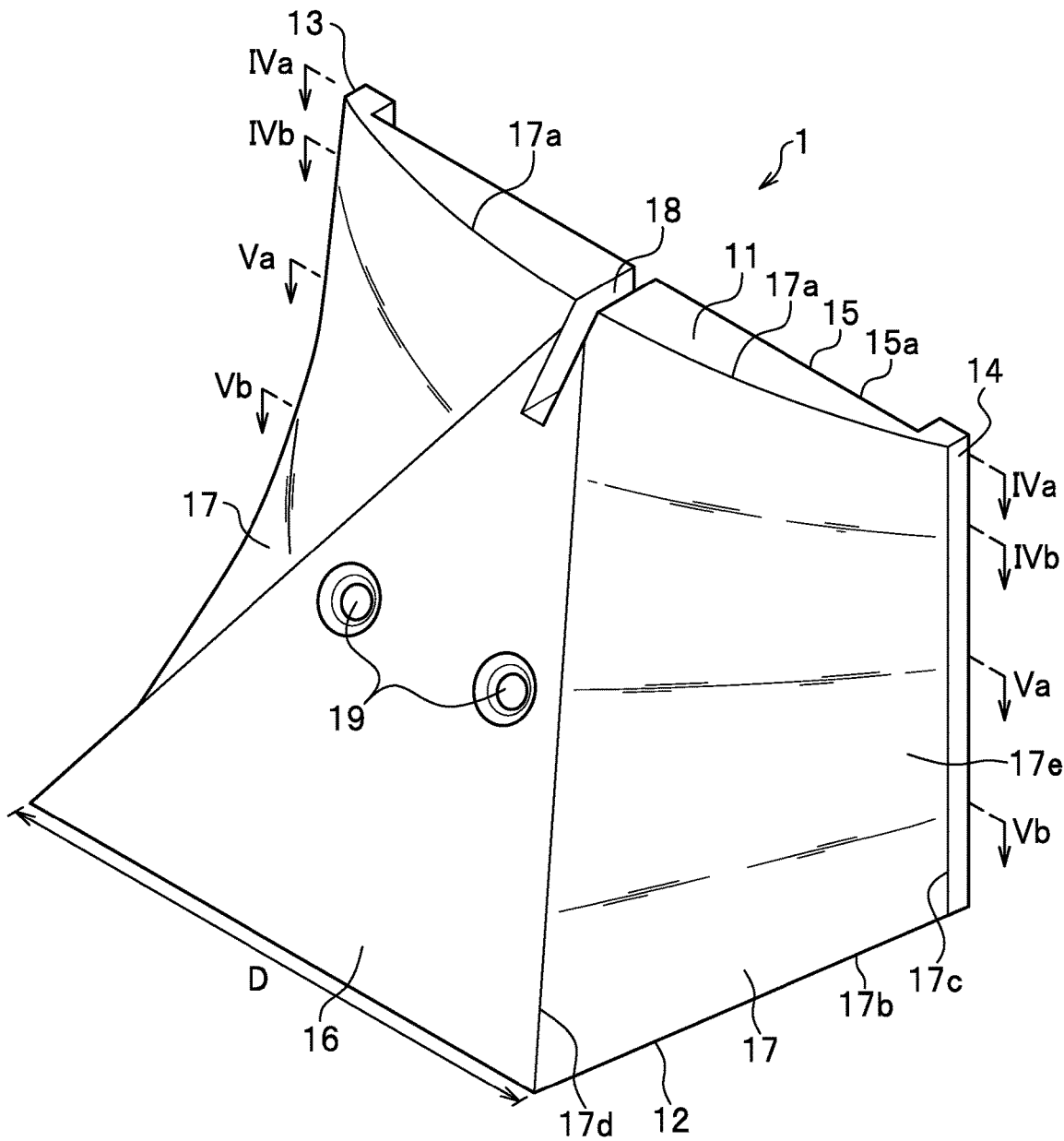
FIG. 3 is a perspective view of a parison guide.

As illustrated in FIGS. 2 and 3, the parison guide 1 is formed of a solid metallic material. The parison guide 1 is formed in the upper end portion with a groove portion 18 which is created by downward cutting of a predetermined depth. The groove portion 18 opens upward as well as radially inward and outward. Cooling passages 19 are formed inside the parison guide 1 to have cooling water (cooling medium) flow therethrough. The cooling passages 19 are connected via a conduit (not shown) to allow cooling water to flow therethrough.

The surface of the parison guide 1 includes an upper face 11, a lower face 12, a left side face 13, a right side face 14, an inner side face 15, a width expanding face 16, and a pair of contact faces 17, 17.

The upper face 11 is flat and substantially shaped as a bow described by an arc and a chord. The arc of the upper face 11 extends along the perimeter of a lower face 21b of the core 21. The lower face 12 is substantially trapezoidal when seen from the bottom face.

The left side face 13 and the right side face 14 are each a vertical face shaped as a vertically long rectangle. The left side face 13 connects with one of the widthwise edge portions of the upper face 11. The right side face 14 connects with the other widthwise edge portion of the upper face 11.

The inner side face 15 is a rectangular vertical face. The inner side face 15 connects with the radially inward edge portion of the upper face 11. The inner side face 15 of the present embodiment is a face to which to attach a letter L-shaped bracket 3 that connects the parison guide 1 to the core 21. The letter L-shaped bracket 3 is fixed to the inner side face 15 with a bolt B and to the lower face 21b of the core 21 with another bolt B. A recessed groove 15a is formed in the inner side face 15 for adjustment of the attachment position. Note that the inner side face 15 may be without the recessed groove 15a and flat entirely.

The width expanding face 16 is a tapered face that inclines in such a manner that its lower edge is located radially outward of its upper edge. The width expanding face 16 gets wider toward its lower edge. The width dimension D of the widest portion of the width expanding face 16 is large enough to allow at least a later-described middle chuck 43a of a gripper 43 to be inserted between the parisons P, P. Flow inlets for the cooling passages 19 are opened in a vertically middle portion of the width expanding face 16.

The paired contact faces 17, 17 are at the left and right sides of the width expanding face 16 and connect with the radially outward edge portion of the upper face 11. The contact faces 17, 17 are faces that contact and guide the widthwise edge portions Pa, Pb of the parisons P to flatten the parisons P.

The contact faces 17 illustrated in FIG. 2 extend along an imaginary line extended from the inclination direction of the outer circumferential diameter expanding surface 21a. The angle $\theta_1$ formed by each contact face 17 and the lower face 12 is set to be the same or substantially the same as the angle $\theta_2$ formed by the outer circumferential diameter expanding surface 21a and the lower face 21b.

Each contact face 17 illustrated in FIG. 3 is formed of a curved surface, and the curvature of its horizontal cross section varies from an upper portion to a lower portion of the parison guide 1. The contact face 17 has an upper edge 17a that connects with the upper face 11, a lower edge 17b that connects with the lower face 12, an inner side edge 17c that connects with either the left side face 13 or the right side face 14, and an outer side edge 17d that connects with the width expanding face 16. The area of the contact face 17 that is surrounded by the upper edge 17a, the lower edge 17b, the inner side edge 17c, and the outer side edge 17d is called a "base face 17e" below.

The upper edge 17a is an arc-shaped curve that corresponds to the shape that the parison P has immediately after being discharged. Specifically, the radius of curvature of the upper edge 17a is substantially the same as that of the lower face 21b of the core 21. The lower edge 17b is straight. In other words, the curvature of a horizontal cross section of the contact face 17 of the present embodiment gets smaller in the extrusion direction, and eventually becomes zero or almost zero. Note that the lower edge 17b may alternatively be a curve that curves outward or inward.

A more detailed description is given as to the shape of the contact face 17.

Figure 4A:
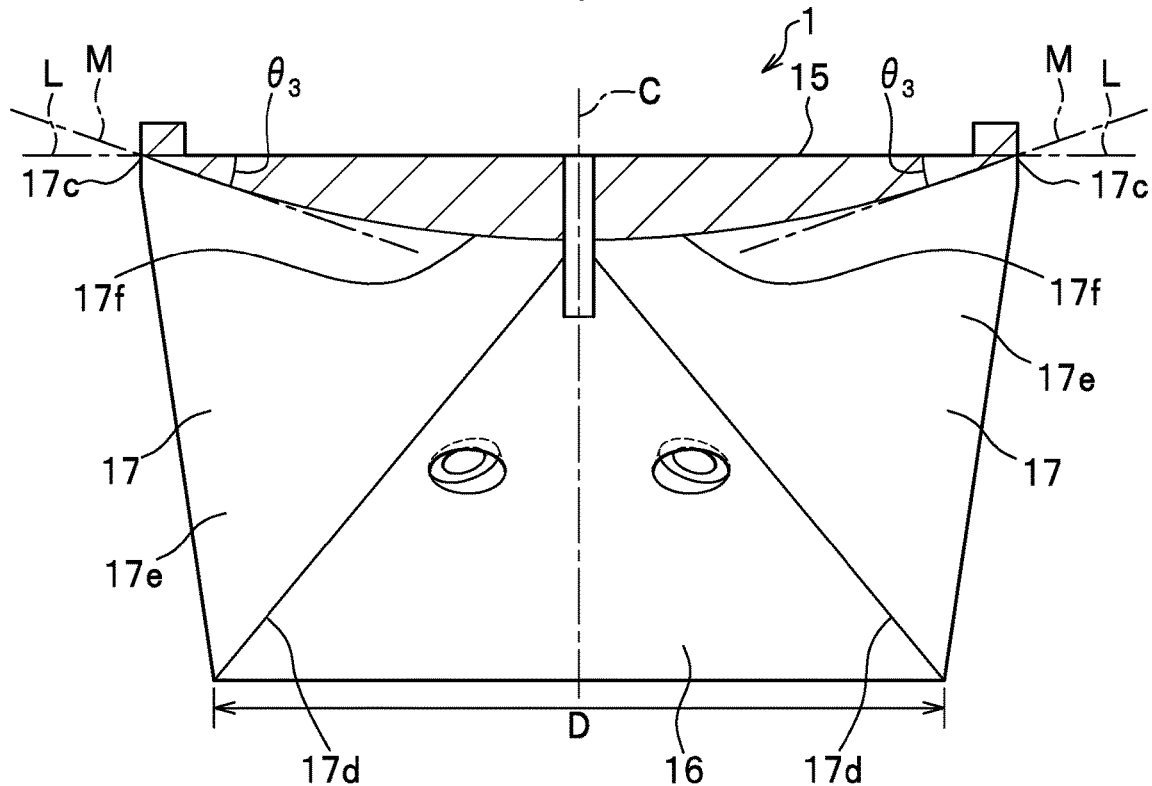
FIG. 4A is a sectional view taken along the line IVa-IVa in FIG. 3.
Figure 4B:
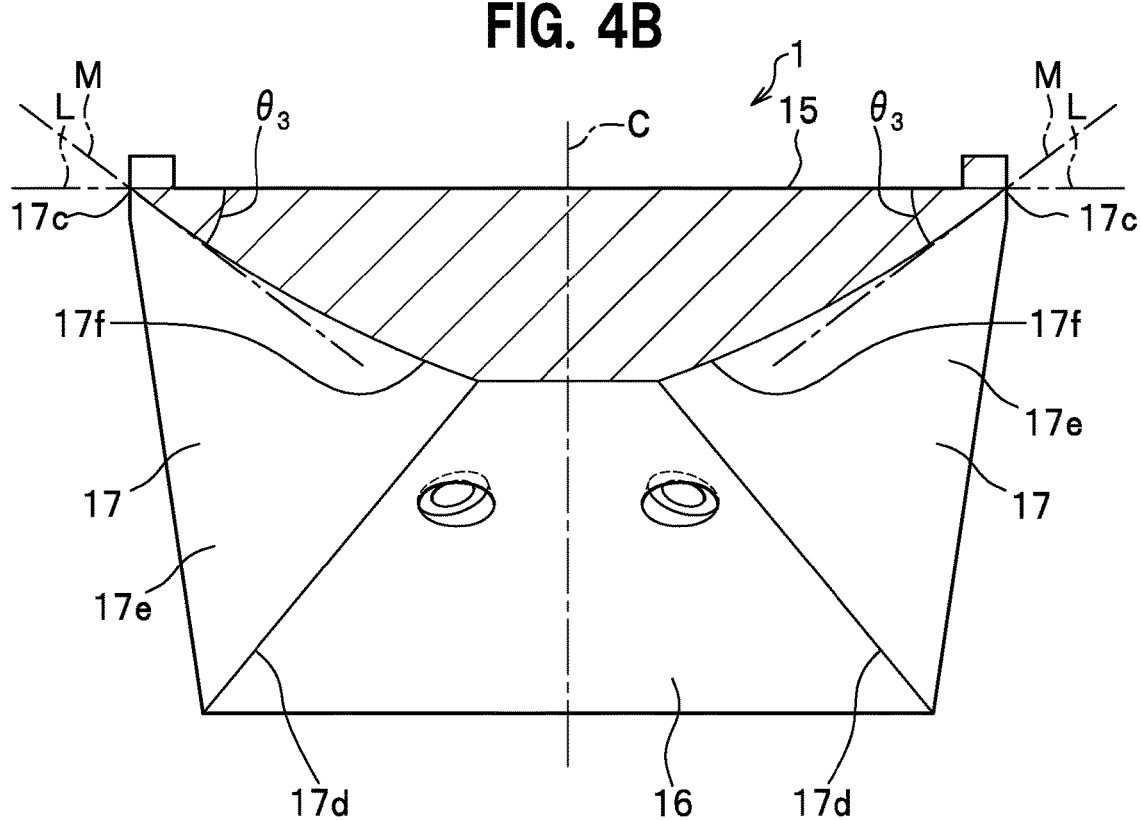
FIG. 4B is a sectional view taken along the line IVb-IVb in FIG. 3.
Figure 5A:
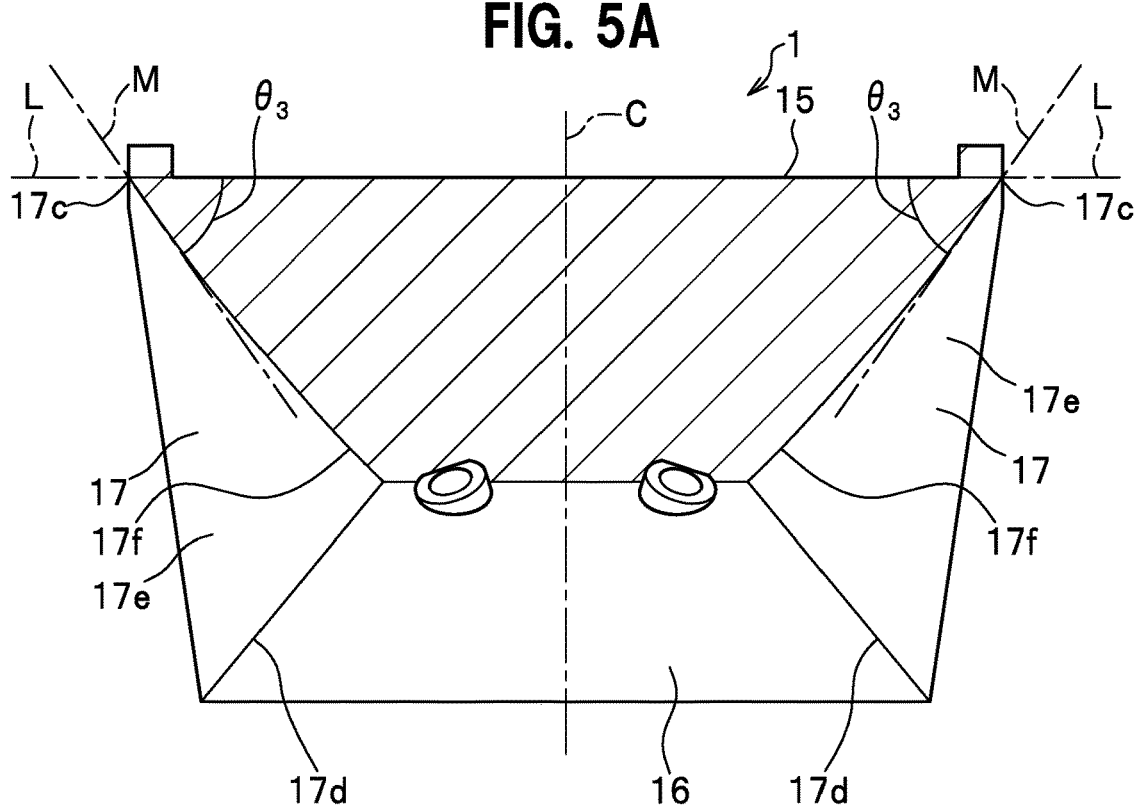
FIG. 5A is a sectional view taken along the line Va-Va in FIG. 3.
Figure 5B:
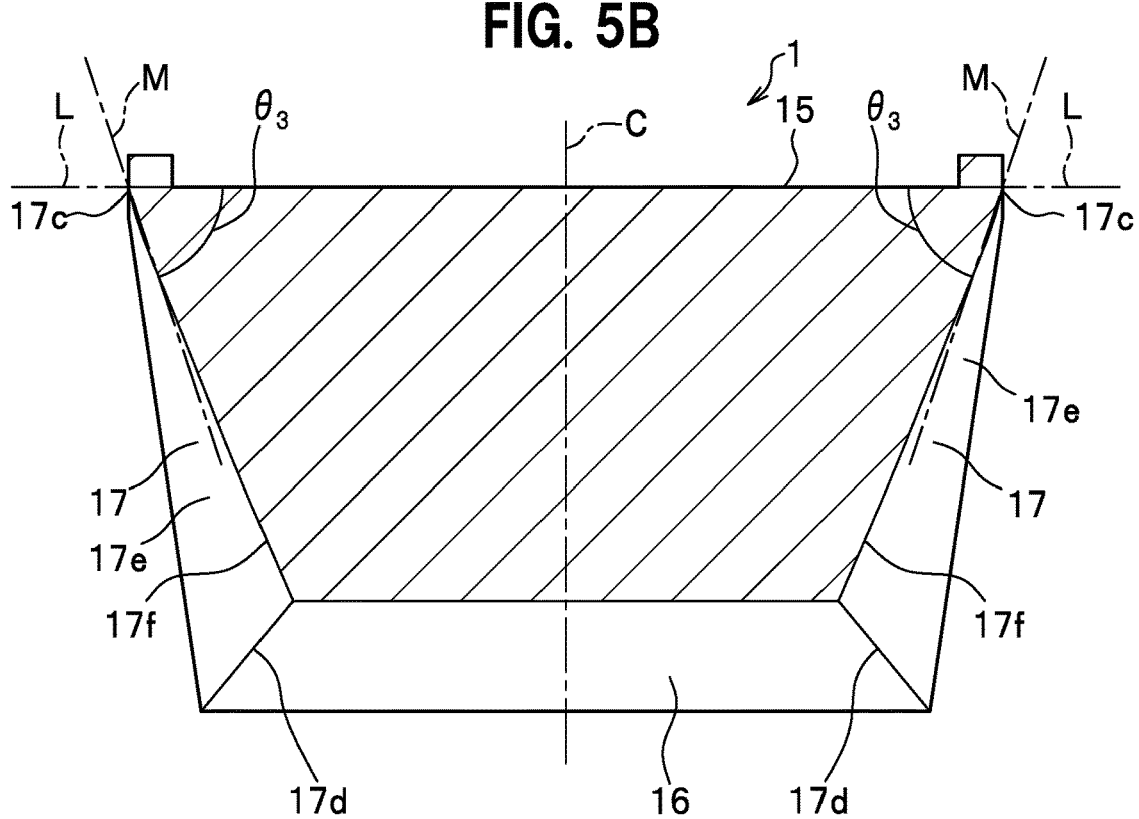
FIG. 5B is a sectional view taken along the line Vb-Vb in FIG. 3.

FIG. 4A is a sectional view taken along the line IVa-IVa in FIG. 3, and FIG. 4B is a sectional view taken along the line IVb-IVb in FIG. 3. FIG. 5A is a sectional view taken along the line Va-Va in FIG. 3, and FIG. 5B is a sectional view taken along the line Vb-Vb in FIG. 3. A line that passes the widthwise center of the parison guide 1 and extends in the radial direction is called a center line C. Further, in FIGS. 4A, 4B, 5A, and 5B, the line of intersection between an imaginary horizontal cross section and the base face 17e is called a line of intersection 17f. Furthermore, an angle formed by an imaginary line L that passes through the plane of the inner side face 15 and an imaginary line M that connects any point on the line of intersection 17f with the inner side edge 17c is an angle $\theta_3$.

As illustrated in FIGS. 4A, 4B, 5A, and 5B, the paired contact faces 17, 17 are formed to be axisymmetrical with respect to the center line C. Each contact face 17 is formed so that, from the upper portion to the lower portion of the parison guide 1, the line of intersection 17f, starting from the inner side edge 17c, gets more and more spaced away from the center line C and the apex of the line of intersection 17f is located more and more radially outward. Further, the contact face 17 is formed so that the curvature of the line of intersection 17f gets smaller and smaller from the upper portion to the lower portion of the parison guide 1. Furthermore, the contact faces 17, 17 are formed so that the angle $\theta_3$ gets larger and larger from the upper portion to the lower portion of the parison guide 1.

Figure 6:
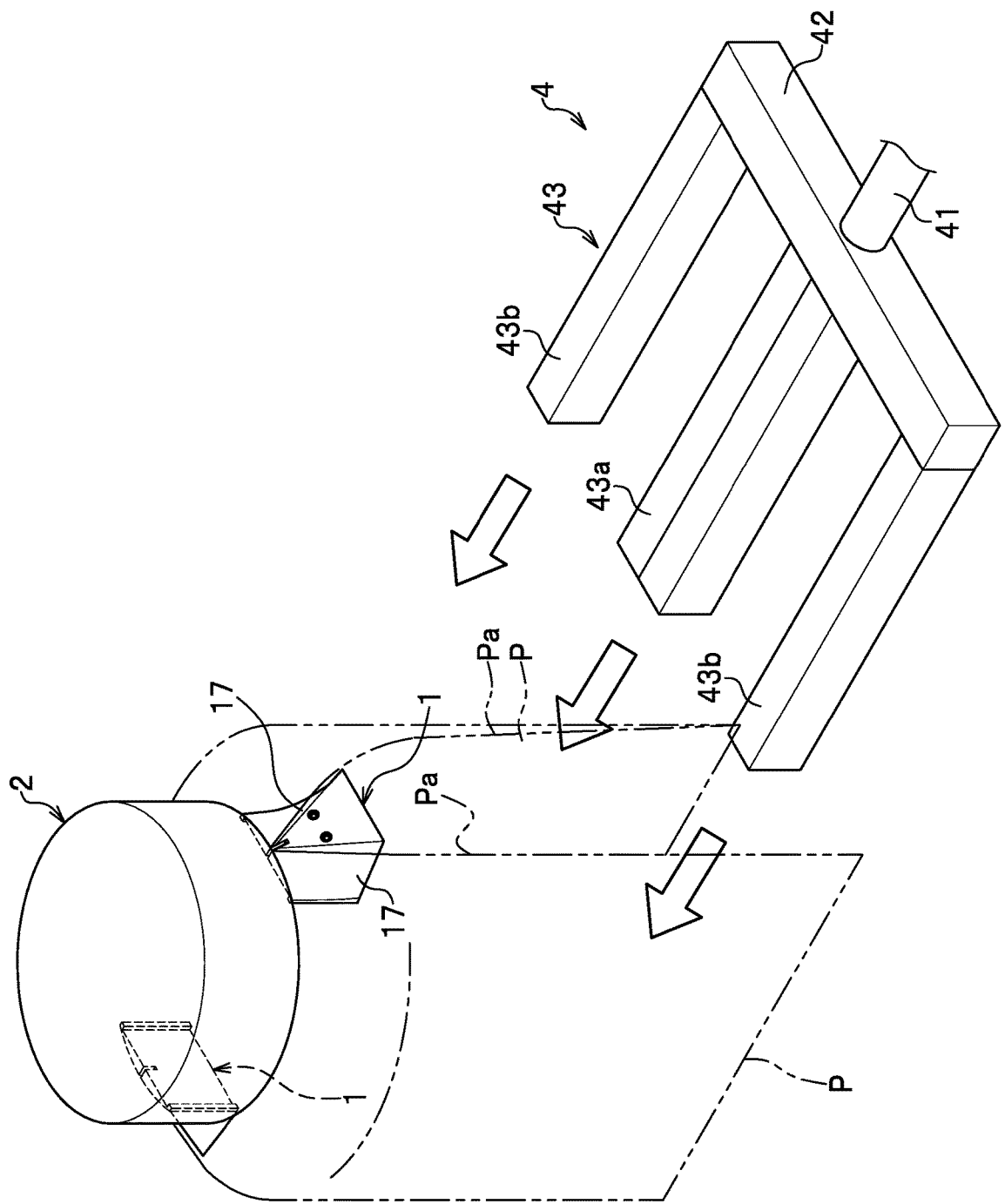
FIG. 6 is a perspective view illustrating a method for manufacturing parisons.
Figure 7A:
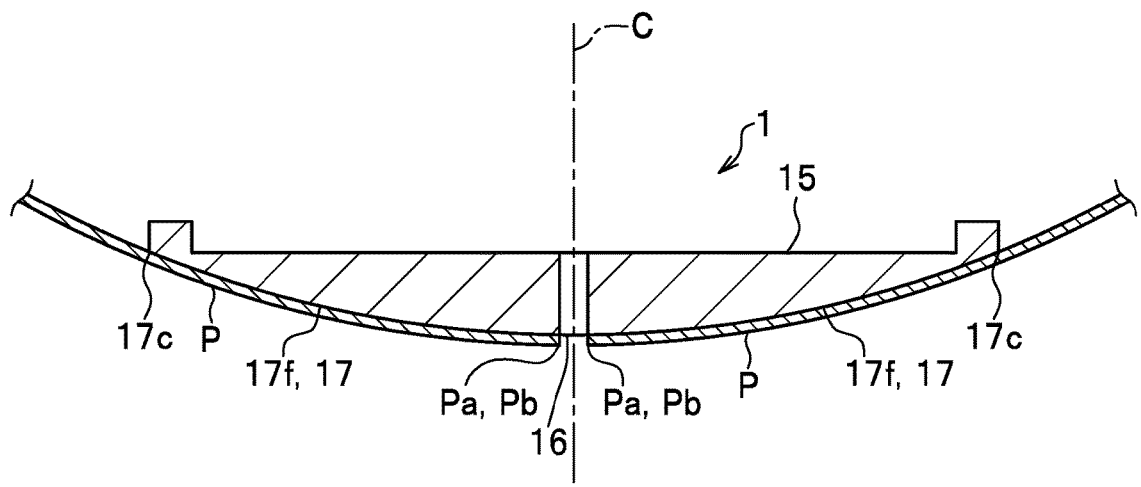
FIG. 7A is an end view corresponding to FIG. 4A.
Figure 7B:
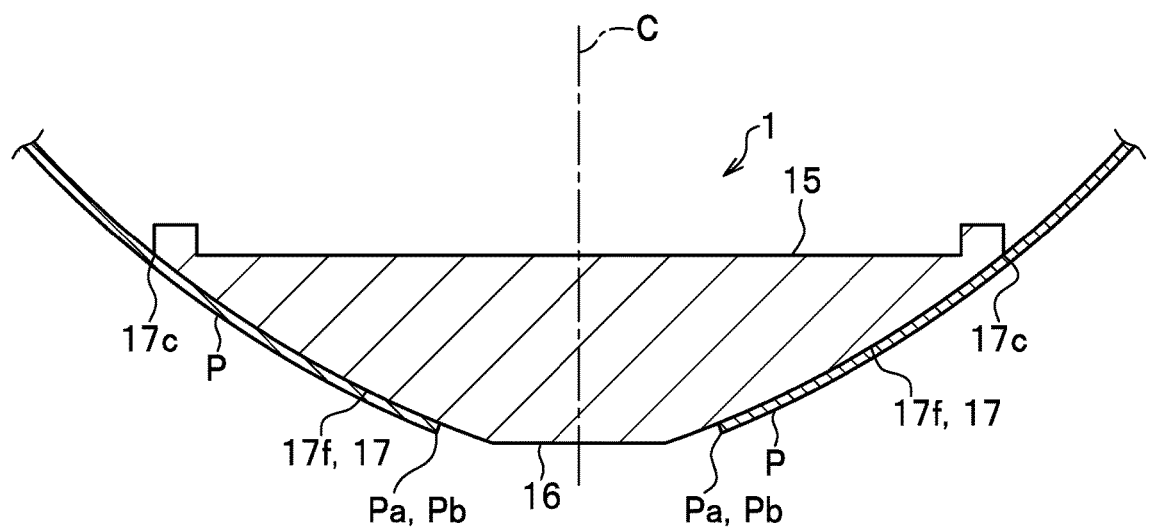
FIG. 7B is an end view corresponding to FIG. 4B.

Next, with reference to FIGS. 6 to 8B, a description is given of a method for manufacturing the parisons P, P. As illustrated in FIG. 6, an apparatus for manufacturing the parisons P, P includes a transport apparatus 4 besides the parison guide 1 and the extrusion apparatus 2. The transport apparatus 4 is a device that sandwiches and grips the paired parisons P, P and transports them to a molding die (not shown). The transport apparatus 4 has an arm 41, a support portion 42 provided to the tip end of the arm 41, and the gripper 43 attached to the support portion 42.

The gripper 43 is made up of the middle chuck 43a and paired side chucks 43b, 43b disposed at the left and right sides of the middle chuck 43a. The side chucks 43b, 43b are movable toward and away from the middle chuck 43a. When the side chucks 43b, 43b are moved toward the middle chuck 43a, the parisons P, P can be sandwiched and gripped between the middle chuck 43a and the corresponding side chucks 43b, 43b.

Once the paired parisons P, P each having an arc shape in horizontal cross section are discharged from the extrusion apparatus 2, the parisons P, P are fed downward, guided by the parison guides 1, 1. In this event, the widthwise end portions of the inner surface of each parison P, P come into sliding contact with (into contact with) the contact faces 17, 17 of the parison guides 1. During this event, cooling water flows through the cooling passages 19 of the parison guides 1.

In this embodiment, in the horizontal cross-sectional views depicted in FIGS. 7A, 7B, 8A, and 8B, each contact face 17 is formed so that, from the upper portion to the lower portion of the parison guide 1, the line of intersection 17f, starting from the inner side edge 17c, gets more and more spaced away from the center line C and the apex of the line of intersection 17f is located more and more radially outward. Thus, the parisons P, P are fed downward with their one widthwise edge portions Pa, Pa (and the other widthwise edge portions Pb, Pb) widening outward in the width direction. The parisons P, P are thus flattened. Moreover, as the width dimension D of the width expanding face 16 gets larger and larger from the upper portion to the lower portion of the parison P, the interval between the one widthwise edge portions Pa, Pa (or the other widthwise edge portions Pb, Pb) of the parisons P, P becomes wider and wider from the upper portion to the lower portion of the parison P.

Although not shown, once the parisons P, P are discharged a predetermined length, the arm 41 of the transport apparatus 4 moves to insert the middle chuck 43a in between the parisons P, P and to locate the side chucks 43b, 43b outward of the respective parisons P, P. The side chucks 43b, 43b are then moved toward the middle chuck 43a, so that the parisons P, P are sandwiched and gripped between the middle chuck 43a and the corresponding side chucks 43b, 43b.

After the upper end portions of the parisons P, P are horizontally cut off by a cutter (not shown) with the parisons P, P gripped by the gripper 43, the arm 41 is moved to transport the parisons P, P to a molding die (not shown).

According to the present embodiment described above, the one widthwise edge portion Pa and the other widthwise edge portion Pb of the parison P are guided by the contact faces 17, and hence no mechanical force such as rotational force is applied to the parison P. Thus, creases are unlikely to be generated at the widthwise end portions of the parison P, and the flatness of the parison P can be improved. Further, since creases are unlikely to be generated at the widthwise end portions of the parison P, the parison P can be gripped by the gripper 43 of the transport apparatus 4 accurately. Moreover, control of the rotation of rollers is unnecessary unlike the conventional technique, and therefore the structure can be simplified.

In the conventional technique previously described, parisons that are suspended in an arc shape comes into contact with a pair of straight bar-shaped rollers. This makes the parisons change their shapes dramatically, and hence makes it difficult to flatten the parisons. By contrast, in the present embodiment, the contact faces 17 are each configured so that the curvature of a horizontal cross section of the contact face 17, at its upper edge, corresponds to the shape that the parison P has immediately after being discharged, and then gets smaller and smaller toward the lower edge of the contact face 17. This configuration allows the parison P to be flattened out gradually along the contact faces 17. Thus, creases are even more unlikely to be generated at the widthwise end portions of the parison P. Further, the gradual flattening of the parison P helps prevent damage in the barrier layer of the parison P.

Moreover, according to the present embodiment, the cooling passages 19 through which cooling water passes are formed in the inside of the parison guide 1. Thus, the parison guide 1 is cooled from the inside by the cooling water, so that the parison P is unlikely to stick to the parison guide 1.

Although the present invention has been described using the embodiment, the present invention is not limited to the embodiment, and can be appropriately changed without departing from the gist of the present invention. The shape of the parison guide 1 is not limited to the one described in the embodiment and can be changed appropriately as long as the parison guide 1 includes the contact faces 17.

Although one parison guide 1 guides the one widthwise edge portions Pa, Pa (or the other edge portions Pb, Pb) of the respective parisons P, P in the present embodiment, the present invention is not limited to such a configuration. For example, each parison guide 1 may be separated into two to guide the one widthwise edge portions Pa, Pa (or the other edge portions Pb, Pb) of the respective parisons P, P separately.

REFERENCE SIGNS LIST 1 parison guide
17 contact face
19 cooling passage
2 extrusion apparatus
21 core
22 die P parison
Pa one edge portion
Pb the other edge portion

The invention claimed is:

1. A parison guide for guiding a parison which has an arc shape in horizontal cross section and is discharged from an extrusion apparatus, the parison guide comprising:
a first guide component and a second guide component disposed apart from each other,
wherein the first guide component is fixed to one end of a discharge portion of the extrusion apparatus, the discharge portion from which the parison is discharged,
wherein the second guide component is opposed to the first guide component and fixed to the other end of the discharge portion of the extrusion apparatus,
wherein the first guide component comprises a first contact face with which a widthwise first edge portion of the parison comes in contact,
wherein the second guide component comprises a second contact face with which a widthwise second edge portion of the parison opposite to the first edge portion comes into contact,
wherein the first guide component and the second guide component guide the first edge portion and the second edge portion respectively to flatten the arc-shaped parison being fed downward,
wherein each contact face of the first contact face and the second contact face includes a curved surface, and
wherein each contact face has a curvature of a horizontal cross section which gets smaller in a discharge direction.

2. The parison guide according to claim 1,
wherein each contact face has a curvature of the horizontal cross section at an end portion of the contact face closer to the extrusion apparatus, and
wherein the curvature corresponds to a shape that the parison has immediately after being discharged.

3. The parison guide according to claim 1,
wherein each guide component of the first guide component and the second guide component includes an upper face with an arc and a trapezoidal lower face with a straight lower edge,
wherein each contact face extends between the upper face and the lower face, and
wherein each contact face has a contour in horizontal cross section which changes from the arc to the straight lower edge as each contact face extends from the upper face to the lower face.

* * * * *